(12) United States Patent
Bunker et al.

(10) Patent No.: US 6,715,588 B2
(45) Date of Patent: Apr. 6, 2004

(54) SPOT TYPE DISC BRAKE WITH PARKING BRAKE FUNCTION

(75) Inventors: Kenneth James Bunker, Rearsby (GB); Stephen Roy Orton, Rugby (GB)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/148,137

(22) PCT Filed: Nov. 30, 2000

(86) PCT No.: PCT/GB00/04637

§ 371 (c)(1),
(2), (4) Date: Sep. 24, 2002

(87) PCT Pub. No.: WO01/40671

PCT Pub. Date: Jun. 7, 2001

(65) Prior Publication Data

US 2003/0106748 A1 Jun. 12, 2003

(30) Foreign Application Priority Data

Nov. 30, 1999 (GB) .............................................. 9928162

(51) Int. Cl.[7] ............................................ F16D 55/224
(52) U.S. Cl. ..................................................... 188/72.7
(58) Field of Search ........................ 188/72.6, 72, 72.7, 188/72.8, 72.9, 196

(56) References Cited

U.S. PATENT DOCUMENTS 3,724,605 A    4/1973   Naismith et al.
3,848,704 A   11/1974   Falk
3,934,684 A    1/1976   Evans
3,941,221 A    3/1976   Pringle
4,036,329 A *  7/1977   Anderson ................. 188/72.7
4,499,977 A    2/1985   Wang
4,635,761 A    1/1987   Smith et al.
4,966,256 A * 10/1990   Hunt ....................... 188/72.7
5,433,298 A *  7/1995   Antony et al. ........... 188/72.7
6,484,852 B1  11/2002   Bunker

FOREIGN PATENT DOCUMENTS

| GB | 829883   |   | 3/1960 |
| GB | 861648   |   | 2/1961 |
| GB | 969866   |   | 9/1964 |
| GB | 992733   |   | 5/1965 |
| GB | 2177171  A | 1/1987 |
| WO | 98/05879 |   | 2/1998 |

* cited by examiner

Primary Examiner—Christopher P. Schwartz
(74) Attorney, Agent, or Firm—Howard & Howard

(57) ABSTRACT

A spot-type automotive disc brake (10) provides parking brake and primary brake functions based on the same pair of friction elements (16, 18) and without resorting to supplemental drums or supplemental friction elements. The mechanism is simple and can be made at a size applicable to small mass produced vehicles. A sliding disc (12) has fixed (42) and actuated (40) friction elements at its opposite sides. A piston (64) and an external bifurcated lever mechanism (72) act completely independently yet symmetrically on the actuated friction element (16) without any common thrust-transmitting parts, whereby the asymmetry and complexity and consequential unreliability and high cost and duplication of mechanisms of prior proposals is avoided.

7 Claims, 8 Drawing Sheets

SPOT TYPE DISC BRAKE WITH PARKING BRAKE FUNCTION

BACKGROUND OF THE INVENTION

1. Field of the Invention

This invention relates to automotive braking systems and in particular to spot-type automotive disc brakes incorporating a secondary or parking brake function.

2. Description of the Related Art

The state of development of spot-type automotive disc brakes is such that it is indisputable that the absence of a simple and successful and cost-effective parking brake function comes as a surprise and is indicative of serious technical difficulties in providing this fundamental requirement for automotive vehicles, bearing in mind the considerable investment of the automotive industry in design and development of disc brake systems over four or five or more decades.

Automotive vehicles incorporating disc brake systems are of course provided with parking and secondary brake systems which are in use, and these will be reviewed below together with the most pertinent ones of the paper proposals which are also known to the applicants. So far as parking brake systems in actual use are concerned, the position is that (with one exception, see below) there is not in actual commercial use, to the best of the Applicants' knowledge, a spot type automotive disc brake in which a parking or secondary brake function is provided using the same friction elements as are actuated by the primary braking system. Usually of course the primary braking system is a hydraulic system. The nearest approach to such a dual purpose disc brake is provided on certain models of Jaguar cars and utilises an additional pair of friction elements and an associated additional mechanical actuating mechanism for these, so that the primary hydraulic disc brake system is provided with a secondary mechanical disc brake offering the parking brake function. Such an arrangement is an undesirable response to the need for a simple and economical disc brake system which would be applicable to small inexpensive vehicles as well as to larger and more costly ones.

All the other parking brake systems currently used in relation to automotive vehicles having disc brakes involve some use of drum brakes, such as the provision of rear drums (in substitution for the rear disc), or the provision of rear drums as a supplement to the rear disc brakes, or the provision of a drum-type transmission brake. None of these proposals, likewise, meets the requirement for a simple and cost-effective and compact disc brake system providing both primary and secondary/parking brake functions.

So far as paper proposals are concerned, the applicants are aware of:

U.S. Pat. No. 4,499,977 (Wang)
U.S. Pat. No. 3,941,221 (Pringle)
U.S. Pat. No. 3,724,605 (Naismith)

and these prior proposals will be reviewed.

The Wang specification discloses an integral park brake mechanism for a disc brake of the fixed disc and moving caliper kind in which the usual hydraulic piston and cylinder assembly 1, 15 in the caliper on one side of the disc acts through a rod 2 so as to actuate the friction element at that side of the disc (and through the moving caliper the other friction element is also actuated). The parking brake function is integrated with the hydraulic actuating function by means of an apertured locking collar 3 through which the rod 2 extends and which can be tilted to grip the rod and to apply to the rod an actuating thrust from a parking brake lever 4.

This arrangement is stated to meet the requirement for locking during actuation and self-releasing after actuation. However, the Applicants know that such an arrangement is technically undesirable for actual commercial use due to the obvious fact that a simple locking mechanism involving a rod and a locking collar, with the rod sliding in a bore formed in the hydraulic piston, is completely undesirable in terms of mechanical reliability for a mechanism located in the hostile environment of automotive disc brakes where temperature extremes and significant amounts of water and dust and other foreign matter are routinely applied to the mechanism during routine daily use. As a result, the mechanism is obviously unreliable and the statements in the description at column 4 line 25 onwards that the operation of the park brake mechanism is quite independent of the operation of the hydraulic brake, and the reference to the failure of one of the brakes not affecting the function of the other, is clearly technically wrong. Obviously a locking mechanism of the kind disclosed is liable to stay locked after use in the conditions described. Likewise the free sliding of the rod 2 within the bore in the hydraulic piston is likely to become restricted and finally prevented so that the hydraulic and parking brake functions are locked together and rendered unreliable if not inoperative. Hence the reasons why this mechanism has never been introduced in actual commercial use.

The Pringle brake takes a different approach to the construction of the parking brake mechanism by adopting a mechanical actuator located within the piston and cylinder assembly of the primary brake actuator system. This is also the "one exception" mentioned earlier and a fixed disc disc brake having such a parking brake (but otherwise not constructed as disclosed in Pringle) is in commercial use. Such an arrangement is mechanically difficult and costly to construct. This is partly because the mechanism has to be constructed relatively so small due to the space constraints imposed by the correspondingly small piston and cylinder assemblies utilised in disc brakes for the rear wheels of small vehicles, taking account of the front/rear braking proportions which are conventionally utilised. As a result, the mechanical parking brake mechanism within the hydraulic cylinder is effectively a mechanism almost of watch-like construction complexity and proportions and which is required to operate in the hostile environment of a braking system in terms of the temperatures and hydraulic fluid. In short, such an arrangement is technically and commercially undesirable as a solution to the requirement for a simple and cost effective mechanism. These same comments apply equally to the Naismith disclosure which shows a similar mechanism.

Two additional prior art references which have come to the attention of the applicants are:

GB2177171A (Kelsey Hayes)
WO98/05879 (Brake Technologies Pty)

The Kelsey-Hayes specification discloses improvements in self-adjusting parking brakes, particularly for use on rear-axle disc brake assemblies. The parking brake actuator is preferably a "bolt-on" type assembly intended for external mounting to a disc brake caliper. Use of a "bolt-on" parking-brake actuating assembly eliminates the necessity of having front and rear axle disc brake assemblies of different design since the parking brake mechanism is not an integral part of the disc brake assembly (page 1, column 1, at lines 35 to 40). Therefore, as shown in FIG. 3, the parking brake arrangement is asymmetrically arranged with respect to the main structure of the brake, and such is unacceptable in terms of its effect on the operation of the primary braking mechanism due to the need for balanced and uniform operating and wear characteristics, as far as possible. The deliberate adoption of an asymmetric configuration causing corresponding non-uniformity of operating and wear characteristics is generally unacceptable.

In the Brake Technologies Pty specification, there is disclosed a disc brake assembly of the kind in which the brake disc 23 is oil-immersed, and provided with full-annulus (or substantially full-annulus) friction element engagement facilities. Brakes of this kind are conventionally used as transmission brakes in heavy duty vehicular applications, including tractor brakes, for example. A primary actuating mechanism of the hydraulic kind is provided, together with a fail-safe emergency/parking type braking mechanism based upon spring elements 62, 63 to cause application of the emergency-parking brake in the event of failure of the hydraulic fluid system. The general arrangement of the brake can be seen in FIGS. 1 and 2, and it is evident that such a brake is not of the spot-type automotive disc brake kind employing a lever-operated parking brake mechanism. Therefore, taking account both of disc brake systems in use and prior proposals, there remains a substantial requirement for a lever-operated parking and/or secondary brake system for use in spot-type automotive disc brakes and meeting one or more of the requirements outlined above, or at least providing a better compromise between the various conflicting factors than the disclosures in the prior proposals discussed above.

BRIEF SUMMARY OF THE INVENTION

Thus, we have identified a need for the provision of a parking brake assembly in which the complexity and cost and unreliability of the Naismith and Wang disclosures is mitigated or overcome, while preserving the lack of asymmetry of the actuating arrangements therein. Likewise, we have identified the need for eliminating the asymmetry which is fundamental to the approach in the Kelsey-Hayes disclosure and for eliminating the duplication of hardware likewise inherent in the Jaguar construction. Thus the embodiments of the present invention seek to provide, particularly for the cost-conscious spot-type automotive disc brake market, a parking or secondary brake assembly which is able to use the simple thrust-generating capabilities of a lever mechanism while avoiding duplication of actuation systems and friction pads, and avoiding likewise the actuation asymmetry which has represented the Achilles heel of the other proposals discussed above.

In the described embodiments of the invention, there is provided a parking brake arrangement in which, by adopting a lever mechanism which is constructed and adapted in accordance with the format of the primary brake operating mechanism (primarily by symmetrically accommodating either a single central cylinder or two spaced actuating cylinders), the combination of the convenient and effective generation of actuation thrust by the lever mechanism, and a simple symmetrical thrust-application system in which the friction elements have a reasonable chance to wear uniformly.

By adopting a lever construction which can straddle a single actuating cylinder, or the equivalent arrangement in which twin actuating cylinders straddle a single lever assembly, the problem which led the prior art to adopt mechanisms of watch-like complexity and/or an out-of-balance asymmetry, is solved.

Therefore, taking account both of disc brake systems in use and prior paper proposals, there remains a substantial requirement for a parking and/or secondary brake system for use in automotive disc brakes and meeting one or more of the requirements outlined above, or at least providing a better compromise between the various conflicting factors than do the prior proposals discussed above.

According to the present invention there is provided a disc brake as defined in the accompanying claims.

In an embodiment of the invention described below the primary and secondary actuating mechanisms of the brake are constructed so as to be completely independent with respect to each other. As a result, the thrust applied by each actuating mechanism to the same one of the friction elements (on that side of the disc) reaches that friction element by a path which is independent and separate from that of the other mechanism. As a result, there is no common thrust transmission component in the primary and secondary actuating mechanism (as is the case in the Wang and Naismith references). Each of these mechanisms acts on the same friction element, but in fact applies its thrust to that friction element through an end thrust delivering surface which is spaced from the corresponding surface of the other actuating mechanism. In other words, the two mechanisms act on the friction element at laterally spaced-apart locations. In one embodiment, the piston of the primary hydraulic actuating mechanism acts on the friction element though a part-circular or cylindrical projecting structure integral with the piston, and the thrust delivering end of the parking brake mechanism is received (with clearance) in a slot formed therein and engages the friction element generally on the axis of and thus symmetrically with respect to the piston and through the curved surface of a profiled thrust-applying member.

In an alternative arrangement in which the primary actuating mechanism has spaced apart twin cylinders, the secondary or parking brake mechanism is disposed symmetrically between these.

Other aspects of the independent relationship of the primary and secondary actuating mechanisms include the following. Firstly, a malfunction of one mechanism has no effect on the other mechanism whereas, for example, in the Wang mechanism the adoption of thrust paths for the two mechanisms which coincide at the rod 2 of Wang means that a failure of one mechanism is likely to seriously affect the other mechanism. Likewise, the complete independence of the primary and secondary actuating mechanisms in the embodiments of the present invention also means that the parking brake mechanism imposes no constraints on the retraction of the primary or hydraulic system after use, such as would occur in Wang when the rod 2 no longer slides freely within the bore of the piston 1. Moreover, in specific contradistinction to Wang, the piston of the hydraulic mechanism in the embodiments of the present invention provides no mounting whatever for the parking brake mechanism. The piston of the embodiments serves only to generate brake-actuating thrust. According to another important feature of the embodiments of the present invention, the rotatable disc is mounted so as to be capable of sliding movement axially thereof and said friction elements being mountable on a fixed caliper or bridge structure straddling the disc, whereby the brake-applying thrust applied by the secondary actuating mechanism to provide a secondary or parking brake function causes frictional engagement of the disc with the other one of the pair of friction elements without the need to transmit a thrust to that friction element through a moving caliper or bridge structure, and the reaction thrust generated by both said primary and secondary actuating mechanisms is resisted by said fixed caliper or bridge structure. In other words, by virtue of adopting a sliding disc configuration for the disc brake, the parking brake function can likewise adopt a simple one-sided configuration without the need (such as arises in a fixed disc brake assembly) to provide a corresponding oppositely-directed thrust to the friction element on the other side of the disc. This latter friction element is simply squeezed against a fixed stop (provided by the fixed caliper or bridge) by the axial movement of the disc under the action of the parking brake lever mechanism, and the reaction thrusts are all resisted well.

To put it another way, the general configuration of the disc brake utilising a sliding disc and a fixed caliper in the embodiments means not only that the one-sided lever action is sufficient to apply both friction elements to the disc, but also the general structure of the brake is such that the reaction forces generated by the lever mechanism can be conveniently applied to the robust and fixed and stable structure which supports the fixed caliper or bridge of the brake and in no way compromises the effective operation of the primary braking system.

In order to create a well-balanced actuation arrangement for the brake, the embodiments provide the secondary brake actuating mechanism comprising a bifurcated lever member which straddles the piston and cylinder assembly of the primary actuating mechanism so as to be able to apply a balanced and symmetrically distributed thrust therewith to the friction element generally on the axis of the piston. Where the brake comprises a pair (or more) of piston and cylinder assemblies, then the lever mechanism can be disposed symmetrically between these without the need actually to invade the central space of the piston (by means of a slot etc therein) as described above.

To compensate for wear of the friction elements, the secondary brake actuating mechanism is provided with an adjustment mechanism. In one embodiment, the adjustment mechanism is adapted to move the pivot of the lever mechanism towards the actuated friction element as wear of the friction element occurs, whereby the lever is maintained in a constant actuating attitude relative to the friction element despite the wear of the latter.

In an alternative adjustment arrangement the lever of the lever mechanism is provided with an adjustment member which progressively moves as the friction element wears so as to change the dimensions of the lever member accordingly. In one arrangement, this is achieved by a pivoted sub-lever mounted on the main lever and controlled by a simple ratchet mechanism.

Further embodiments of the invention provide two or more slidable discs with interleaved axially movable friction elements between the discs. The brake may be provided as a front (or even intermediate) wheel of a vehicle as well as or alternatively to the use of the brake on a rear wheel of a vehicle.

BRIEF DESCRIPTION OF THE SEVERAL VIEWS OF THE DRAWINGS

Embodiments of the invention will now be described by way of example with reference to the accompanying drawings in which.

DETAILED DESCRIPTION OF THE INVENTION

Figure 1:
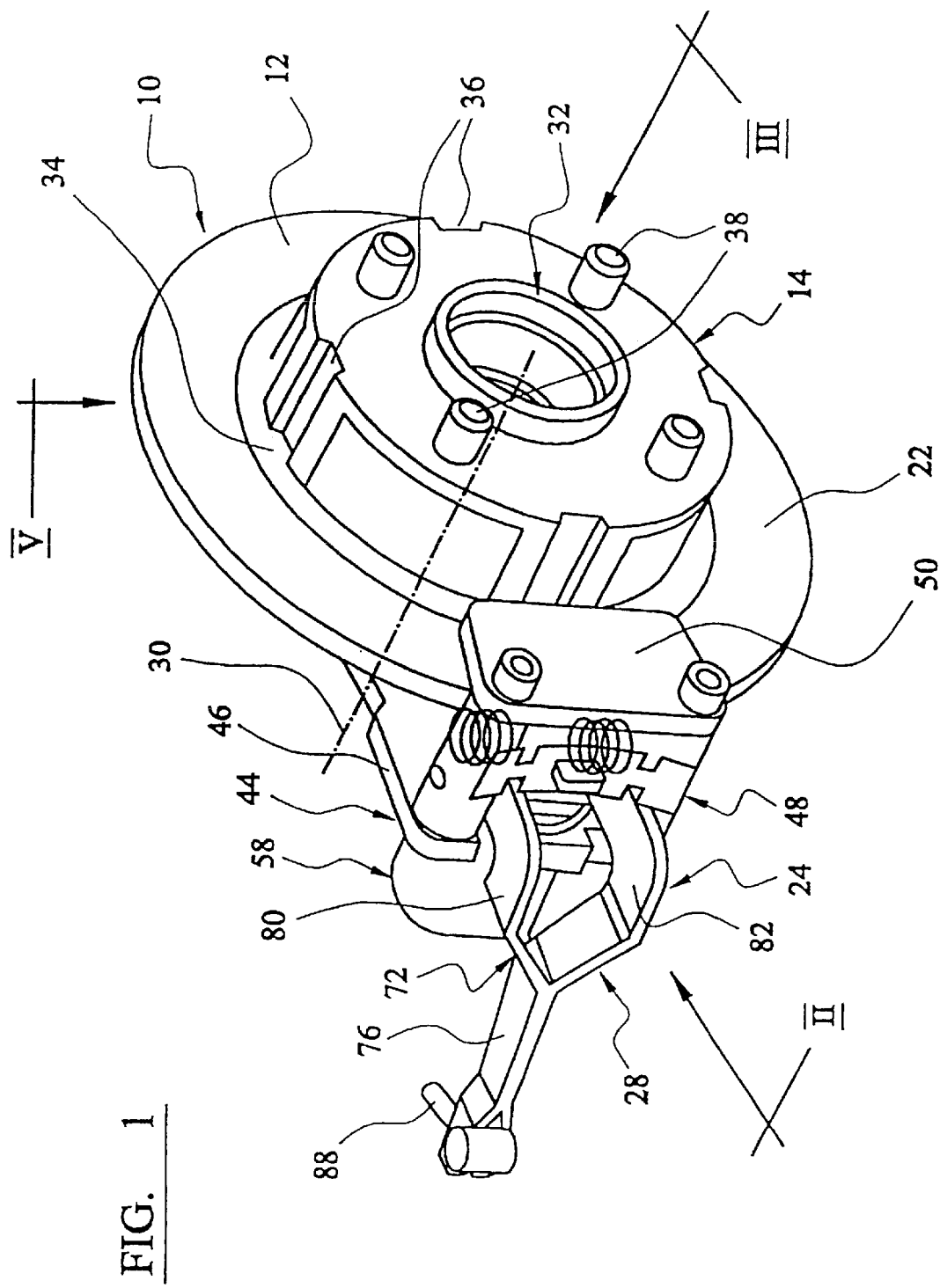
FIG. 1 shows an isometric view of a disc brake assembly.
Figure 2:
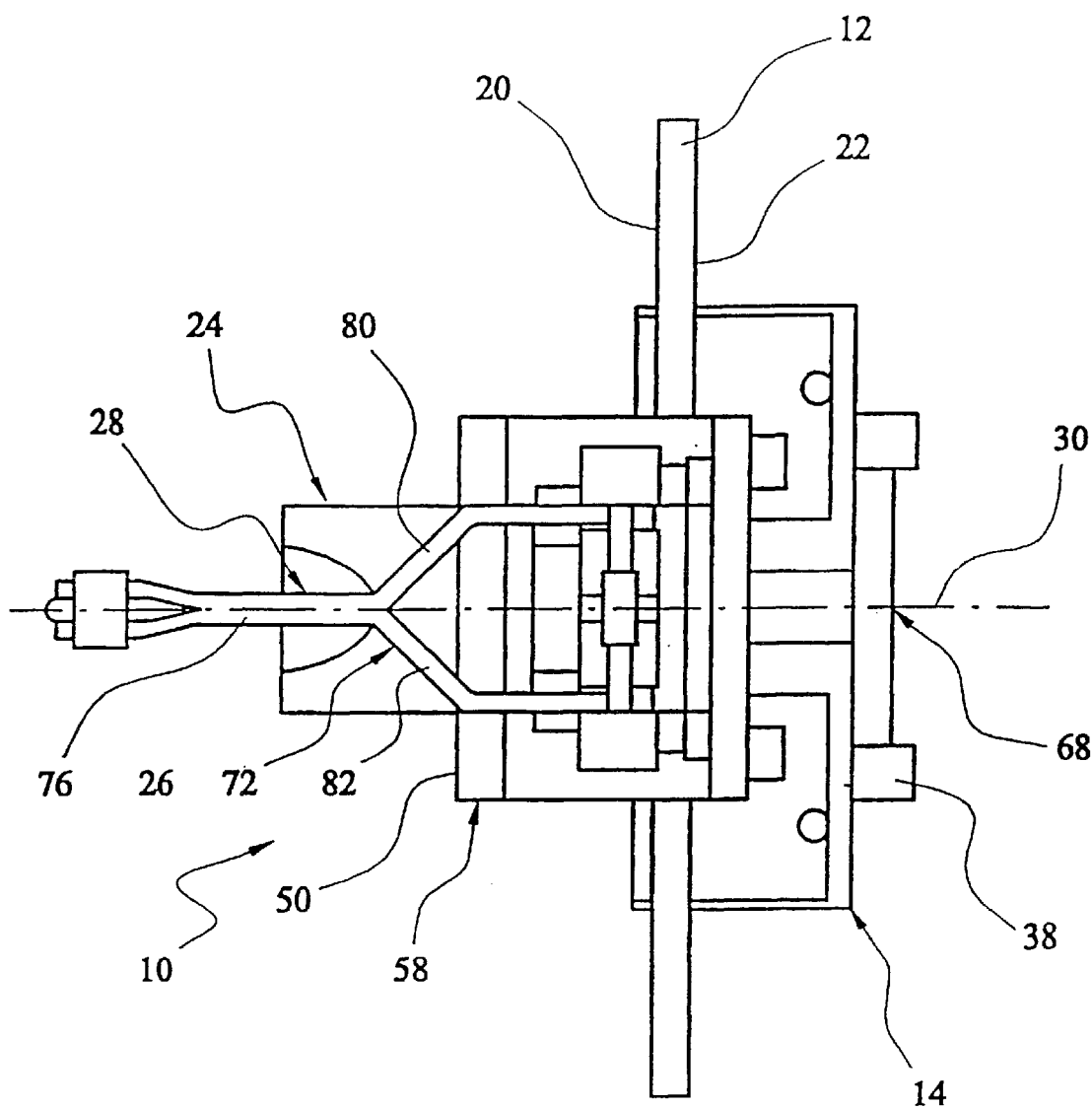
FIG. 2 shows an end elevation view of the assembly of FIG. 1 as seen on arrow II.
Figure 3:
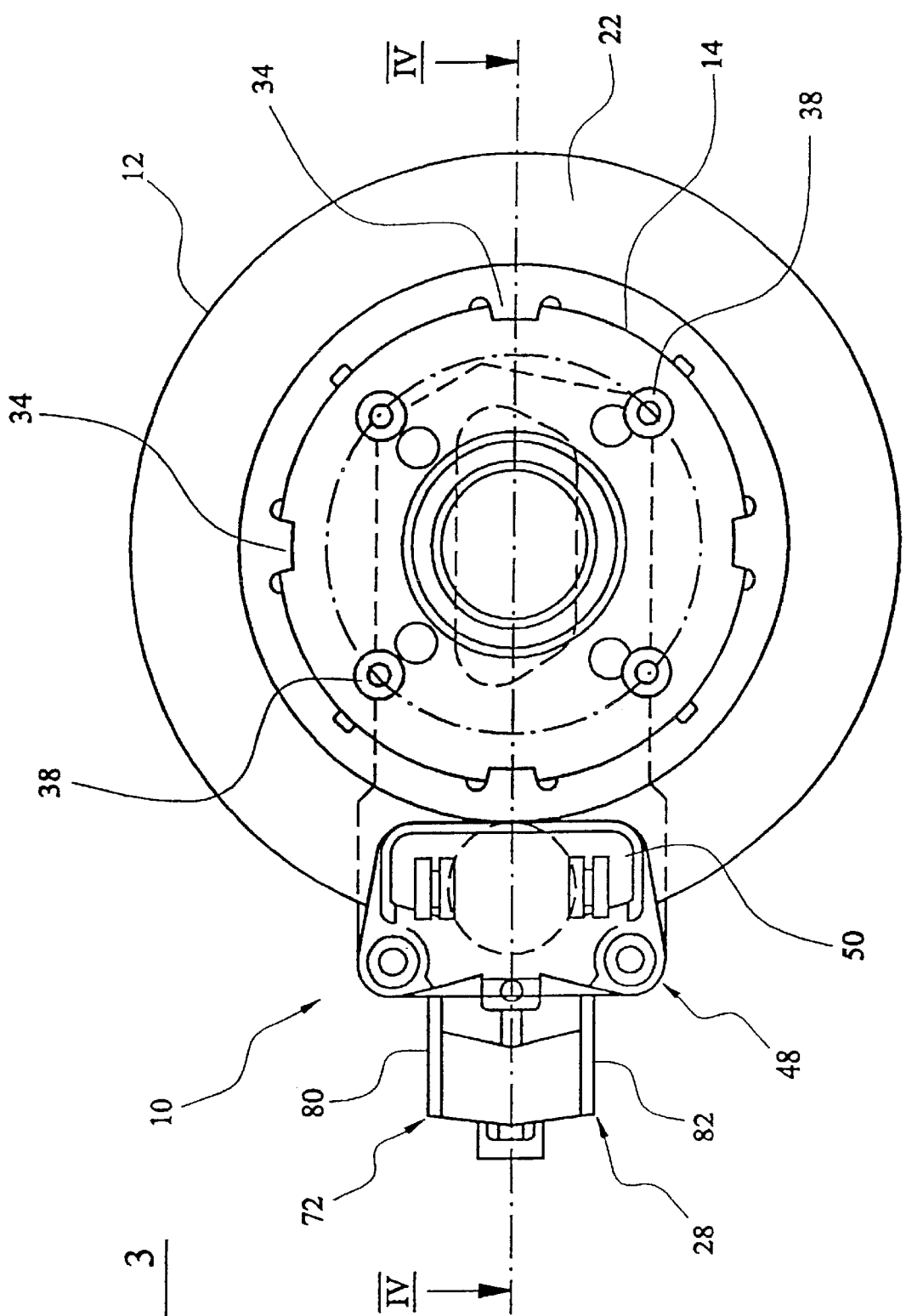
FIG. 3 shows a side elevation view of the assembly of FIG. 1, as seen in the direction indicated by arrow III in FIG. 1.
Figure 4:
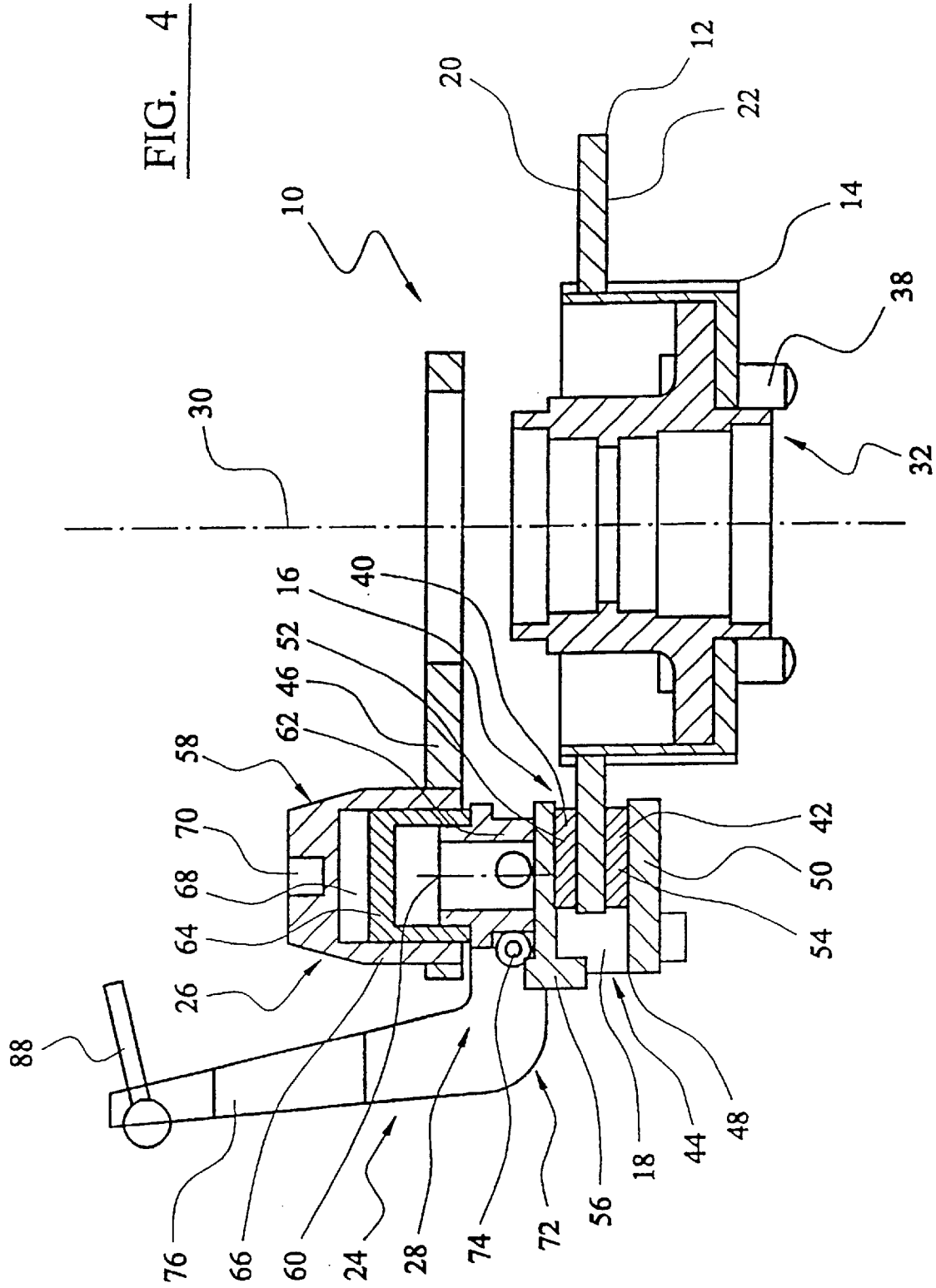
FIG. 4 show a section on the line IV—IV in FIG. 3.

As shown in the embodiment of FIGS. 1 to 5, a disc brake 10 comprises at least one rotatable brake disc 12 and an axially fixable mounting hub 14 therefor. A pair of friction elements 16, 18 are provided for frictional engagement with opposite sides 20, 22 of disc 12.

An actuating mechanism 24 is provided for the brake 10 and is adapted to effect frictional engagement of the friction elements 16, 18 with the opposite sides, 20, 22 of disc 12.

Actuating mechanism 24 comprises primary 26 and secondary 28 (including parking) actuating mechanisms which are both adapted to engage the same one namely friction element 16, of the pair of friction elements 16, 18, to effect frictional engagement of friction element 16 with disc 12 as part of the process of engaging the brake. Friction element 16 is thus the actuated or active friction element whereas friction element 18 is the non-actuated or passive friction element as will be clear from the description which follows.

The primary and secondary or parking actuating mechanisms 26, 28 respectively are constructed so as to be completely independent with respect to each other so that the thrust applied by each mechanism to the active friction element 16 reaches friction element 16 by a path which is independent and separate from that of the other mechanism. This feature of the mechanism will be discussed in further detail below.

Rotatable disc 12 of brake 10 is mounted on rotatable mounting 14 therefor so as to be capable of sliding movement axially (see axis 30 in FIG. 1) thereof whereby the thrust applied by secondary actuating mechanism 28 to active friction element 16 to produce a secondary or parking brake function causes frictional engagement of disc 12 with passive friction element 18, without the need to transmit thrust to passive friction element 18 through a moving caliper or bridge structure straddling the disc.

Having thus identified the principal structures and functions of brake 10, these will now be discussed in further detail below.

Disc 12 and its mounting 14 are constructed as a journalled assembly 32 to be mounted in relation to a tyre-carrying rear road wheel of an automotive vehicle accordingly. FIG. 1 indicates the drive-dogs relationship between disc 12 and its mounting 14 whereby the disc is axially slidable by means of drive-dogs 34 and corresponding grooves 36. Mounting 14 carries wheel studs 38.

Non-rotatably mounted with respect to disc 12 and the mounting 14 for disc 12 is a fixed bridge assembly 44 comprising a mounting plate 46 at the inboard side of disc 12, a caliper 48 extending in the outboard direction from mounting plate 46 across the outer periphery of disc 12, and a stop plate 50 at the outboard side of disc 12. All this structure is fixed and non-rotatably mounted with respect to disc 12 by virtue of connecting structure (not shown) to the body of the automotive vehicle.

Friction elements 16 and 18 comprise pads 52, 54 of friction material. In the case of active friction element 16, its respective friction material pad 52 is bonded to a metal backing plate 56. In the case of friction element 18, its pad 54 is bonded to stop pate 50. Backing plate 56 is slidably mounted on caliper 48 for axial movement in a direction generally parallel to wheel axis 30.

Actuating mechanism 24 comprising primary actuating mechanism 26 and secondary actuating mechanism 28 will now be described further. Primary actuating mechanism 26 comprises a hydraulic piston and cylinder assembly 58 mounted on mounting plate 46 for actuation movement of the piston lengthwise of actuation axis 60, whereby structure 62 (in the form of a flanged [see FIG. 4] part-cylindrical thrust collar 62 which is slidably received in and forms an extension of piston 64 of cylinder 66, engages backing plate 56 of active friction element 16. The details of this arrangement will be described more fully in relation to FIG. 6 below.

The headside chamber 68 between piston 64 and cylinder 66 is connected through a port 70 to the hydraulic control system for the primary (foot-pedal-operated) braking system of the vehicle.

Figure 5:
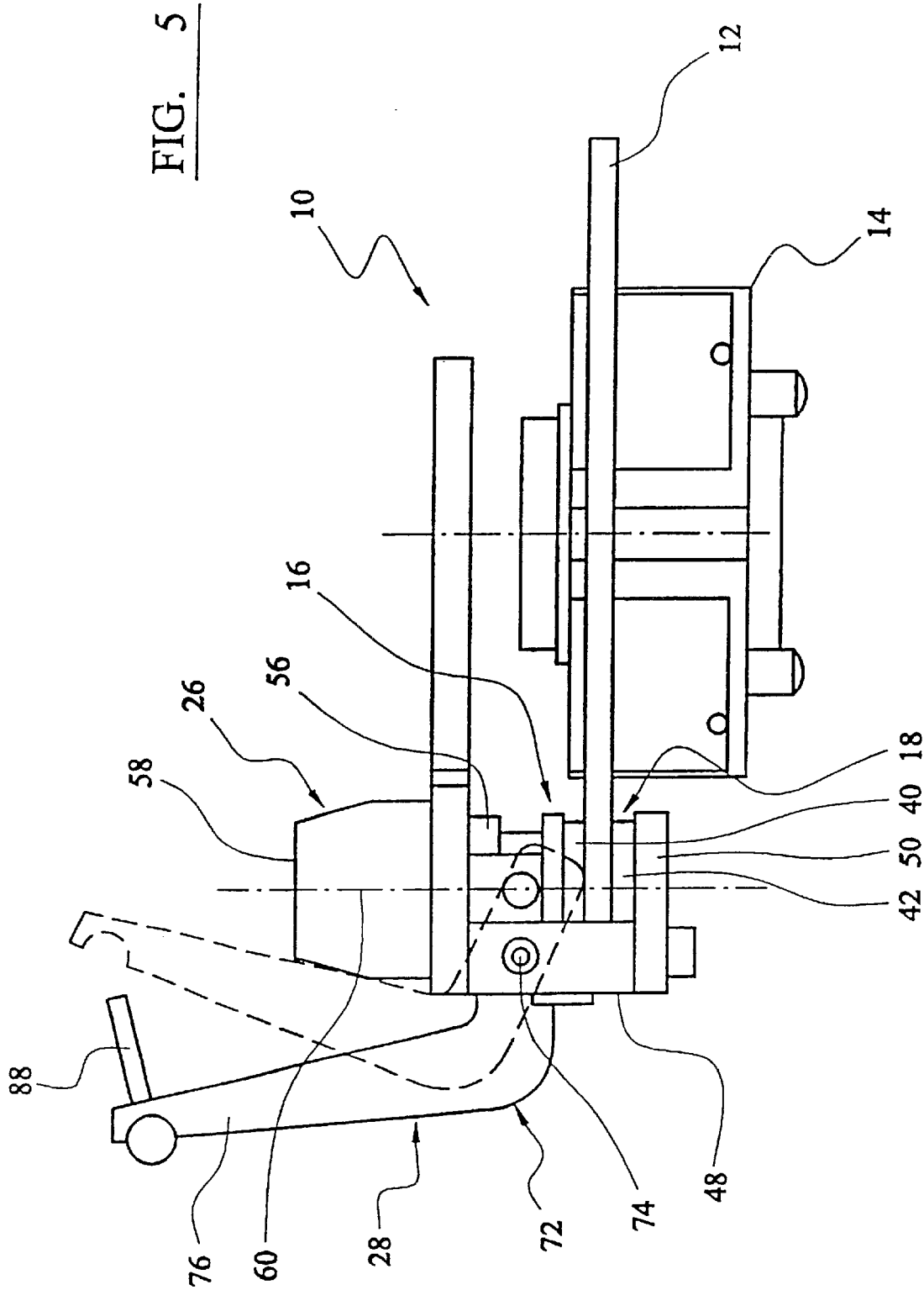
FIG. 5 shows a planned view, corresponding to the sectional view of FIG. 4, and as seen in the direction of arrow V in FIG. 1.

Secondary actuating mechanism 28 comprises a lever mechanism 72 mounted on the axially fixed structure provided by caliper 48 and mounting plate 46 for pivotal clockwise movement about a lever axis 74 from the position shown in full lines in FIG. 5.

Lever mechanism 72 comprises a bifurcated lever member 76 straddling the piston and cylinder assembly 58 of the primary actuating mechanism 26.

As mentioned above the primary and secondary actuating mechanism 26 and 28 are constructed so as to be completely independent with respect to each other, so that the thrust applied by each mechanism to the active friction element 16 reaches that friction element by a path which is independent and separate from thrust of the other mechanism. Thus, in the case of the primary hydraulic actuating mechanism 24, comprising piston 64 and cylinder 66, the thrust is applied to active friction element 16 through thrust collar 62, direct from piston 64. A slot (not shown in FIG. 4 but illustrated by means of the slot 78 identified in FIG. 6) is formed in thrust collar 62 to allow the two lever limbs 80, 82 which straddle piston and cylinder assembly 58 to be connected by an actuating bar 84 (FIG. 6) which is received in slot 78 with clearance. Bar 84 is provided with a smoothly curved profiled central actuating boss 86 to engage backing plate 56 of active friction element 16 generally centrally thereof and approximately on the actuation axis 60 of piston and cylinder assembly 58.

Thus, it can be seen that the two actuating mechanisms 26 and 28 are indeed completely independent with respect to each other in terms of their mode of actuating the active friction element 16. This is because each can apply trust to that friction element quite independently by a thrust path which shares no component with that of the other actuating mechanism and indeed applies that thrust to the friction element backing plate at a location which is laterally spaced from (yet generally symmetrically disposed with respect to) the location at which he other actuating mechanism applies its thrust. Thus, lever mechanism 72 applies its thrust generally on the actuation axis 60 and the primary actuating mechanism 28 applies its thrust around the part-cylindrical profile of thrust collar 62. Moreover, the depth of slot 78 is such that thrust collar cannot apply thrust to backing plate 56 through actuating bar 84 and actuating boss 86 because the thrust collar engages the backing plate leaving sufficient clearance in slot 78 for actuating boss 86 not to be then engaging the backing plate.

The mode of operation of brake 10 will now, it is believed, be generally self-evident. Fluid pressure actuation of primary actuating mechanism 26 will result in advancement of piston 64 toward disc 12 causing active friction element 16 to engage the disc and to cause slight axial movement of same towards fixed friction element 18, thereby resulting in frictional engagement of the pads 52, 54 with opposite sides of the disc and engagement of the brake.

Actuation of secondary actuating mechanism 28 by application of tension in cable 88 connected to lever mechanism 72 causes angular movement of lever member 76 about lever axis 74 from the full line position in FIG. 5 towards the broken line position and causes similar actuation of active friction element 16, frictional engagement of same with disc 12 and resulting engagement of passive fiction element 18 with the opposite side of the disc.

Turning now to the adjustment mechanisms for compensating for wear of friction elements 16 and 18, FIG. 5 shows in full and broken lines the position of lever member 76 of lever mechanism 72 in its limit positions corresponding to worn and unworn conditions of the friction pads 52, 54.

Figure 6:
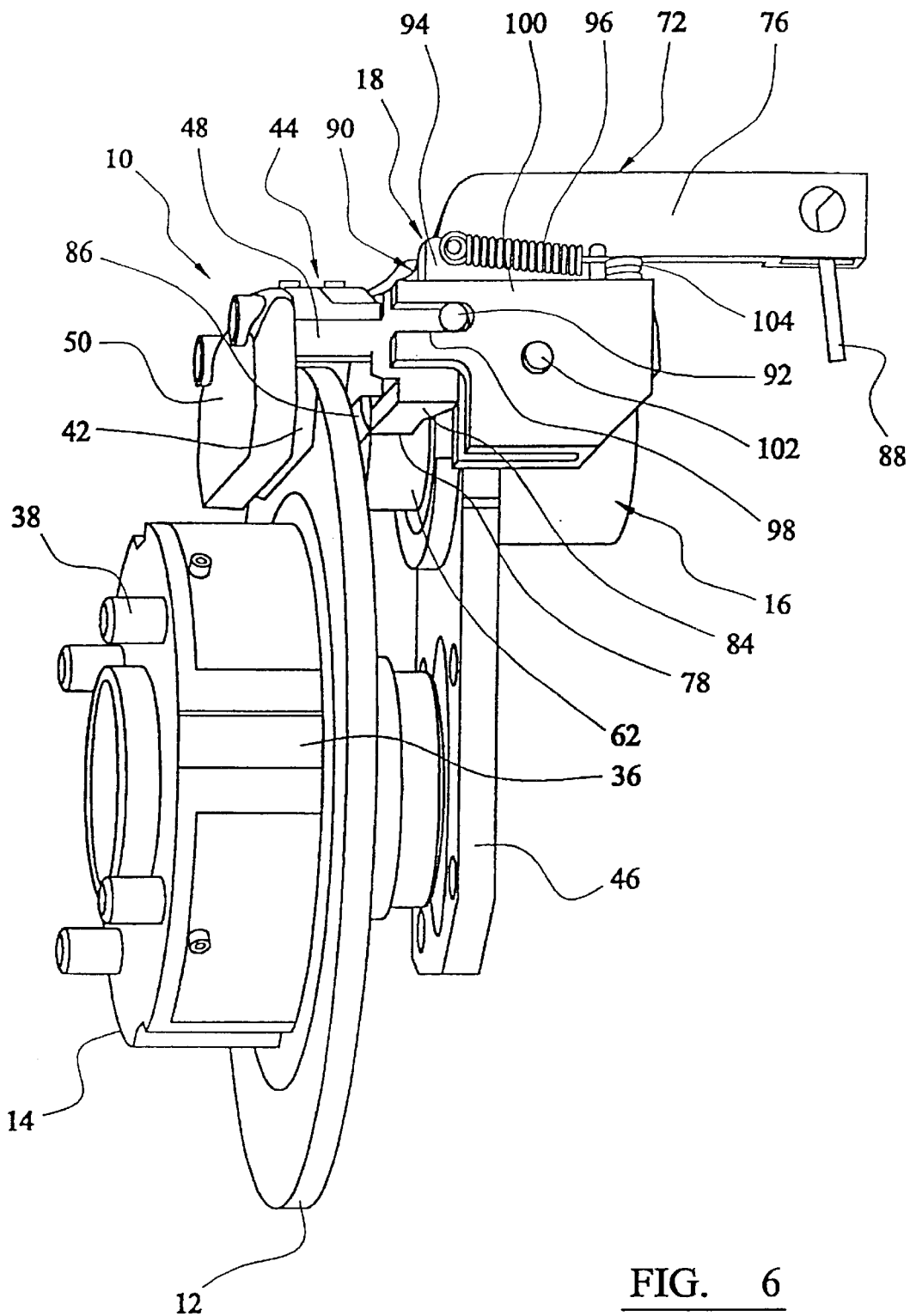
FIGS. 6 and 6A show perspective and side elevation views of a second embodiment of the invention comprising a disc brake assembly partially exploded disc brake assembly.
Figure 6A:
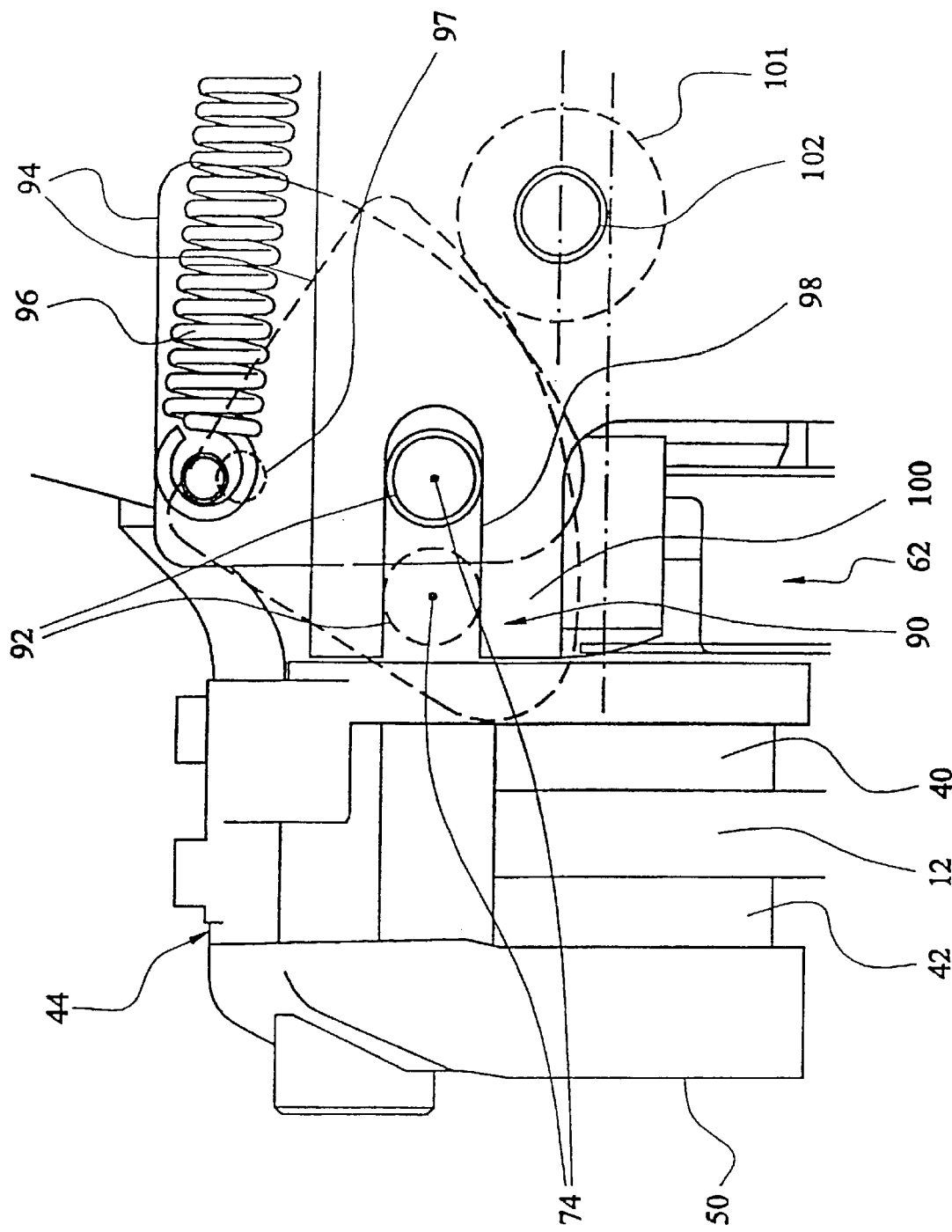

To compensate for the wear of the friction pads adjustment means 90 is provided in FIGS. 6 and 6A which is mounted on plate 46 and adapted to move a lever pivot 92 defining lever axis 74 of the lever mechanism 72 towards the active friction element 16 as the friction elements wear.

This embodiment of the adjustment mechanism is shown in FIGS. 6 and 6A. FIGS. 6 and 6A are provided with reference numerals otherwise corresponding to those of the preceding embodiment, but these Figs show the general arrangement of the adjustment means for moving the pivot of the lever mechanism as mentioned above. For this purpose lever pivot 92 is carried on a sector-shaped adjustment member 94 which is spring-biased by a tension spring 96 acting to pivot the adjustment member outwardly (towards disc 12) about an adjustment pivot 97 while lever pivot 92 is guided linearly in a slot 98 formed in a guide 100 in which is mounted a cylindrical stop 101 (see FIG. 6A) located concentrically on a peg 102.

Lever member 76 is biassed to its released position as shown in FIG. 6 by a compression spring 104. As the friction pads 52, 54 wear, pivot 92 progressively moves outwards in slot 98, whereby the pad wear is compensated-for and the lever member 76 always returns to the same at rest position.

Figure 7:
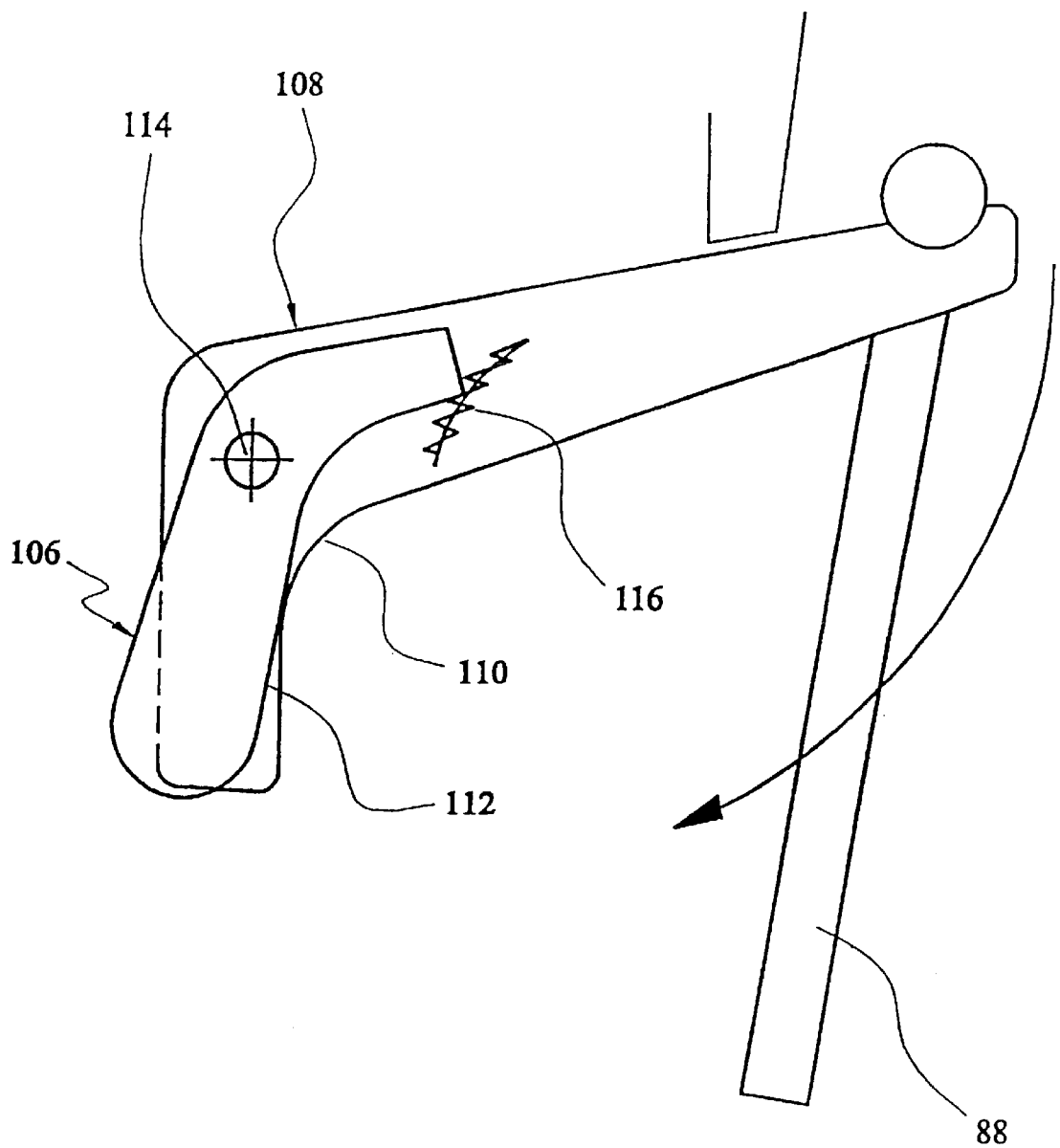
FIG. 7 shows, diagrammatically, an indication of the structure of an adjusting arrangement for a brake actuating lever for use in the preceding embodiments.

In the embodiment of FIG. 7 there is diagrammatically illustrated an adjustment means 106 wherein provision is made for the lever mechanism 108 comprising lever member 110 (which actuates active friction element 16) to progressively change in dimensions as the friction elements wear. This progressive change in dimensions is provided by an adjustment member 112 mounted on lever member 110 for pivotal movement about an adjustment axis 114 progressively under the control of a ratchet mechanism indicated diagrammatically at 116, the ratchet mechanism being responsive to friction pad wear.

What is claimed is:

1. A spot type automotive disc brake of the kind in which a rotatable disc and associated friction elements of the brake are mounted for frictional engagement, at any given time, in one sector only of the annular periphery of the rotatable disc while the remainder of said periphery of the disc at such given time is not subjected to such frictional engagement, and in which a lever-operated secondary braking mechanism is provided, comprising:

a) at least said one rotatable brake disc and an axially fixed rotatable mounting therefor;

b) at least said one pair of friction elements for frictional engagement with opposite sides of said disc;

c) an actuating mechanism adapted to effect frictional engagement of said friction elements with said opposite sides of said brake disc;

d) said actuating mechanism comprising primary and secondary actuating mechanisms both adapted to engage the same one of said pair of friction elements to effect frictional engagement thereof with said disc as part of the process of engaging said brake; characterized by e) said primary and secondary actuating mechanisms being constructed for independent operation such that the brake-applying thrust applied by each mechanism to said same one of said pair of friction elements reaches same by a path without any common thrust-transmitting parts with that of the other mechanism; and said secondary actuating mechanism comprising said lever mechanism adapted to apply an actuating force to said one of said friction elements at a location or locations generally symmetrically disposed with respect to the corresponding location or locations for said primary actuating mechanism: and f) said rotatable disc being mounted on said rotatable mounting therefor so as to be capable of sliding movement axially thereof and said friction elements being mountable on a fixed caliper or bridge structure straddling the disc, whereby said brake-applying thrust applied by said secondary actuating mechanism to said one friction element at one side of said disc to produce a secondary or parking brake function also causes frictional engagement of the opposite side of said disc with said other one of said pair of friction elements and the reaction thrust generated by both said primary and secondary actuating mechanisms is resisted by said fixed caliper or bridge structure.

2. A spot-type disc brake comprising a rotatable disc, at least one pair of friction elements for frictional engagement with opposite sides of said disc, and a primary actuating mechanism and a lever-type secondary actuating mechanism adapted to actuate the same one of said pair of friction elements at generally symmetrically disposed locations thereon, said primary and secondary actuating mechanisms being independent, without any common brake-applying thrust-transmitting parts, and said rotatable disc and a caliper or bridge structure straddling said disc and on which said friction elements are mountable, being mounted so as to be capable of relative axial movement in use.

3. A disc brake according to claim 1 or claim 2 characterised by said lever mechanism of said secondary actuating mechanism being mounted on said caliper or bridge structure.

4. A disc brake according to claim 3 characterised by said lever mechanism being adapted to apply said actuating force to said one of said friction elements at said location or locations generally symmetrically disposed as aforesaid by comprising a bifurcated lever member straddling a piston and cylinder assembly of said primary actuating mechanism.

5. A disc brake according to claim 3 characterised by adjusting means adapted to compensate for wear of said friction elements which are actuated by said primary and secondary actuating mechanisms.

6. A disc brake according to claim 5 characterised by said secondary actuating mechanism comprising a lever mechanism and said adjusting means being adapted to move a pivot of said lever mechanism towards said one of said friction elements as said friction element wears.

7. A disc brake according to claim 5 characterised by said secondary actuating mechanism comprising a lever mechanism and said adjustment means being adapted to cause said lever mechanism to progressively change in dimensions as said friction element wears, said progressive change in dimensions being provided by an adjustment member mounted on said lever mechanism.

* * * * *